Nov. 13, 1945.   D. F. GOTHA   2,388,737
FABRICATION OF ELECTRIC CHUCKS
Filed Jan. 15, 1944

INVENTOR.
DANIEL F. GOTHA
BY Chas. R. Fay
atty.

Patented Nov. 13, 1945

2,388,737

UNITED STATES PATENT OFFICE 2,388,737

FABRICATION OF ELECTRIC CHUCKS

Daniel F. Gotha, Worcester, Mass., assignor to O. S. Walker Co. Inc., Worcester, Mass., a corporation of Massachusetts Application January 15, 1944, Serial No. 518,312

4 Claims. (Cl. 29—155.5)

This invention relates to a method for fabricating chucks and more particularly the invention concerns the fabrication of chuck bodies for receiving the coils of electric chucks.

Objects of the invention include the provision of a method of fabricating an electric coil body for a chuck from a single sheet or plate of iron and avoiding the conventional cast structure and also the method of building up a comparable chuck body by the use of separate bars welded together.

Further objects of the invention include the provision of a method of fabricating a chuck body part for receiving electric coils by cutting out cores from a sheet or plate of iron, removing the cores from the plate, applying the remainder of the iron plate to a conventional bottom plate and positioning the cores within the holes formed by the removal of the cores from the body plate, and placing the electric coils about the cores in the usual manner.

Another object of the invention is the provision of a method of making a chuck coil body by burning cores from a sheet or plate of iron at desired locations, removing the burnt-out cores, enlarging the holes occasioned by the formation of the cores in a desired pattern, thus forming an integral one-piece grill-like plate, securing said grill-like plate to a bottom plate as by welding, securing the said cores substantially centrally of the enlarged holes, and then applying the electric coils in the usual manner.

Other objects and advantages of the invention will appear hereinafter.

Reference is to be had to the accompanying drawing in which.

Figure 1:
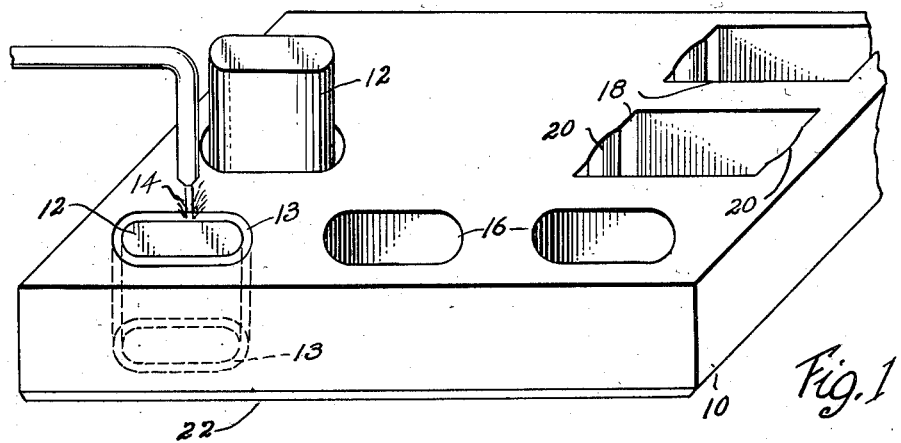
Fig. 1 is a perspective view of an iron sheet or plate and illustrating successive steps in the fabrication of a chuck according to the invention.

In carrying out the invention a sheet or plate of iron 10 having substantially the dimensions required in the finished coil-holding body part of the chuck is cut along lines 13 to remove cores 12, as by means of a flame 14 or by other conventional means. The cores are cut and removed from predetermined locations which determine the approximate final location of the cores in the chuck body as illustrated at 16 wherein the cores have been cut and removed. It is understood that the cutting of the cores proceeds throughout the area of plate 10 in a predetermined pattern and spacing, and this pattern and spacing will assume whatever form is desired in the finished chuck.

When the cores 12 have been removed from the plate 10, leaving a series of holes 16, the latter are enlarged by any desired means such as further burning or milling, etc., to form core receiving holes as illustrated at 18. These holes conform in general to the oval shape of the conventional chuck coils and may be hollowed out at the ends as at 20 for this purpose. When this operation has been completed the coil-receiving body is finished and this body comprises a grill-like plate which is all in one piece and comprises the remainder of plate 10. For illustrative purposes plate 10 is shown as beveled off around its lower edge as at 22 for a purpose to be described.

Figure 2:
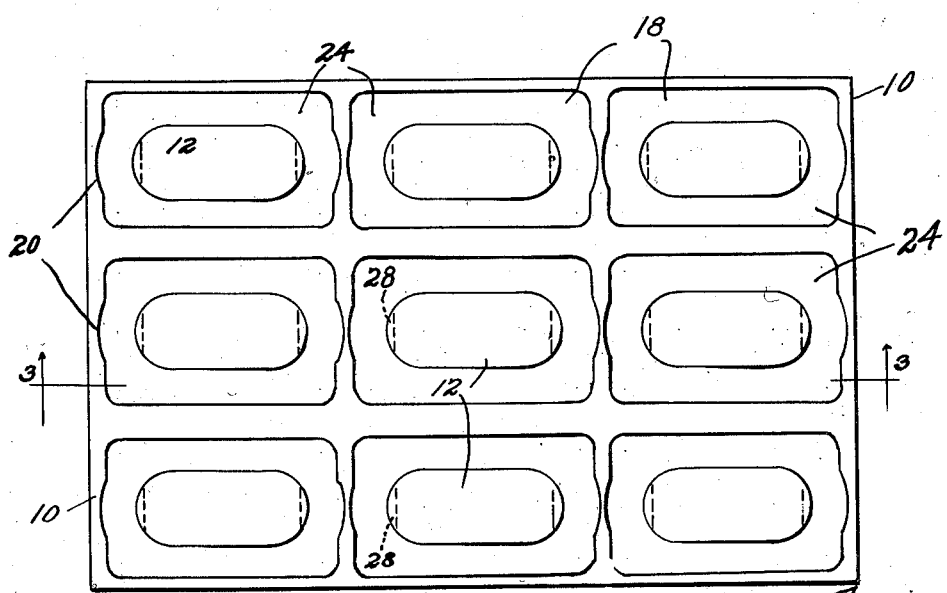
Fig. 2 is a top plate view of the chuck body completed but before the application of the electric coils.
Figure 3:
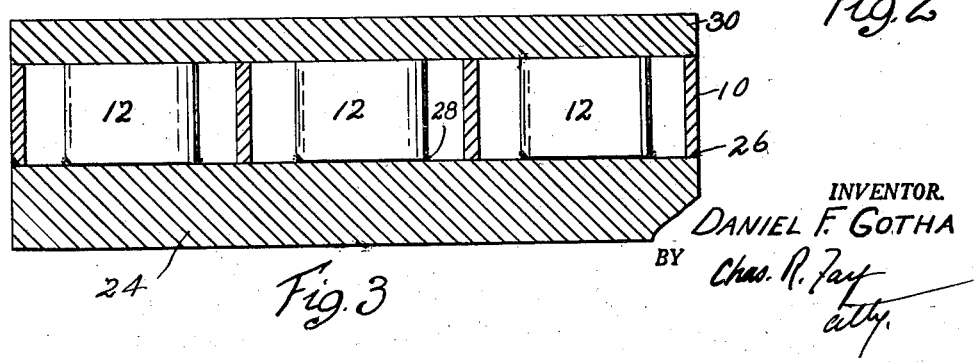
Fig. 3 is a section on line 3—3 of Fig. 2 and showing a top plate.

Bottom plate 24 is utilized to support the grill-like plate and as indicated at 26 the plate may be welded to the bottom plate 24 completely about the periphery thereof. The cores 12 are then positioned centrally of each of the core-receiving holes 18 as illustrated in Fig. 2 and the cores may then be secured to the bottom plate as by tack welding at 28. The chuck is now substantially complete except for applying the electric coils, not shown, around the cores and securing the top plate 30 as by any desired means, preferably by screws or the like for removability.

The top plate may be of any desired construction or configuration as long as the correct registry is made with the cores and the remaining parts of plate 10 and it will be seen that the construction provides that the cores 12 are exactly the same height as the thickness of plate 10 due to the manner in which the cores are produced. Hence no machining of top or bottom surfaces of plate 10 and the coils is necessary and a finishing grinding operation is all that remains to provide good contacting surfaces between the plate 10 and cores 12 with bottom plate 24 and top plate 30. Of course, lead wire apertures must be machined out, but this is conventional in the art.

Having thus described my invention and the advantages thereof, I do not wish to be limited to the details herein disclosed, otherwise than as set forth in the claims, but what I claim is:

1. A method of fabricating chucks comprising removing cores from a plate in a predetermined pattern in the plate, securing the plate and the cores to a bottom plate, with the cores in spaced relation to the walls of the holes formed by the removal of the cores, and applying electric coils surrounding the cores.

2. A method of fabricating chucks including the steps of removing cores from a plate in a predetermined pattern by cutting out the cores completely through the body of the plate, and securing the plate and cores to a bottom plate with the cores located substantially centrally in the holes in the first named plate formed by the removal of the cores therefrom.

3. A method of fabricating chucks comprising removing a series of cores from an iron plate by cutting the plate on closed paths defining the cores, enlarging the holes formed in the plate by the removal of the cores, securing the cores and the remainder of the plate to a bottom plate with the cores located substantially centrally in the enlarged holes, and applying electric coils surrounding the cores.

4. A method of fabricating electric chucks including the steps of forming cores by burning completely through an iron plate on closed paths so that the cores have a dimension equal to the thickness of the plate, removing the cores, enlarging the holes formed by the burning step to a size capable of receiving electric coils, securing the plate to a bottom plate, securing a core to the bottom plate substantially centrally of each of said enlarged holes and applying electric coils in the usual manner.

DANIEL F. GOTHA.